W. W. BEAUMONT.
MANUFACTURE OF TIRES FOR THE WHEELS OF ROAD VEHICLES.
APPLICATION FILED APR. 28, 1920.

1,348,200. Patented Aug. 3, 1920.

INVENTOR
W. Worby Beaumont.

UNITED STATES PATENT OFFICE.

WILLIAM WORBY BEAUMONT, OF WESTMINSTER, LONDON, ENGLAND.

MANUFACTURE OF TIRES FOR THE WHEELS OF ROAD-VEHICLES.

1,348,200.              Specification of Letters Patent.         Patented Aug. 3, 1920.

Application filed April 28, 1920. Serial No. 377,245.

*To all whom it may concern:*

Be it known that I, WILLIAM WORBY BEAUMONT, a subject of the King of Great Britain and Ireland, residing at The Outer Temple, 222 Strand, in the city of Westminster, London, England, have invented new and useful Improvements in the Manufacture of Tires for the Wheels of Road-Vehicles, of which the following is a specification.

This invention relates to solid and pneumatic tires for the wheels of motor and other road-vehicles, and has for its object the prevention or limitation of side-slip.

In the specification to British Letters Patent granted to me and dated 27th December, 1907, No. 28517, is described the construction of rubber wheel-tires wherein the tread of the tire is comparatively wide but is so formed as to afford comparatively feeble support to the edges thereof, so that they may yield slightly in the direction of the load, and thus, by concentrating the pressure and the corresponding wear on the central and main portion of the tread, to insure the maintenance of its edges in a sharply angular condition and in close elastic contact with the surface of the road, so as to act with a squeeze action, with the effect that, on any side-slip movement of the vehicle occurring, the road-surface is scraped and cleaned, and such side-slip prevented or arrested.

By my present improved method of construction, I am enabled to avoid the employment of the lateral grooves or laterally extending fillets described in my aforesaid previous specification, and to overcome the objections incident thereto. The construction of the tire-mold is moreover simplified, and the durability of the tires increased.

In carrying out my improved method of construction, I form the tire of rubber of different degrees of hardness; the central or main portion thereof being of hard rubber of the usual character, while the edges are of comparatively soft rubber; the latter extending some distance along each side thereof, with a view to maintaining the same relative conditions as wear takes place.

Figure 1:
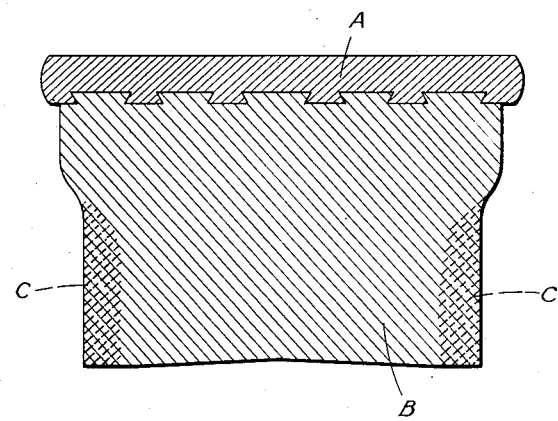
Figure 2:
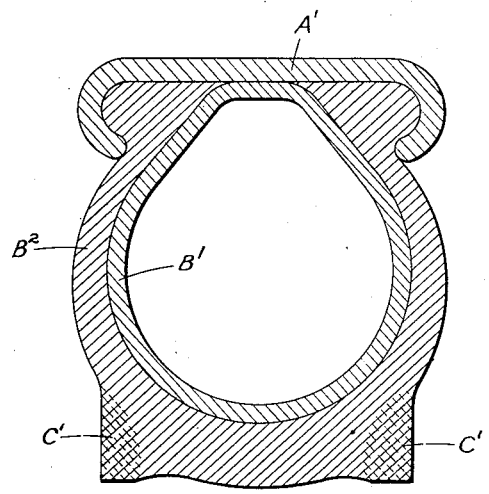

In the accompanying drawings, Figure 1 represents, in transverse section, a form of solid tire in which A is the metal rim of the wheel, B the solid rubber tire, and C, C, the parts composed of the tough, softer and more flexible rubber, formed integral with the main body of the tire. Fig. 2 is a transverse section of a form of pneumatic tire in which $A^1$ is the wheel rim, $B^2$ the usual rubber and fabric tire, $B^1$ the inner tube, and $C^1, C^1$, the parts composed of the tough, softer and more flexible rubber formed integral with the main body of the tire. These sections indicate what I regard as appropriate forms for, as also relative dimensions of, the parts B and C; but both the forms and the relative dimensions of the parts may be varied to meet manufacturing or other requirements.

With a rubber tire constituted in this manner, the greater portion of the tread is composed of material best suited to load-carrying, without either the tendency to wear by detrusion or excessive kneading as the wheel rolls, or the tendency to wear by abrasion; while the edges of the tire are of a softer, tougher or more flexible nature, adapted to maintain close contact with the surface of the road, owing to their readiness to yield under the pressure to which they are subjected. The respective qualities or compositions of rubber adapted to the requirements and located in the manner above described are combined in the process of manufacture by methods known to those skilled in the art.

As tires constructed according to my present invention prevent or limit side-slip, it becomes unnecessary to reduce, and thereby impair, the effective area of the tread-surface forming grooves, indentations or notches therein.

I claim:

For use on the wheels of road-vehicles, a tire composed of rubber of different degrees of hardness for the main portion and for the edges of the tread, integrally combined; the former being composed of material possessing good load-carrying qualities, and the latter, composed of tough and comparatively soft rubber adapted to yield to the load and to maintain the edges of the tread in a sharply angular condition.

WILLIAM WORBY BEAUMONT.